June 9, 1959 J. P. GOULD 2,889,886
WELL HEAD
Filed Jan. 23, 1956 7 Sheets-Sheet 1
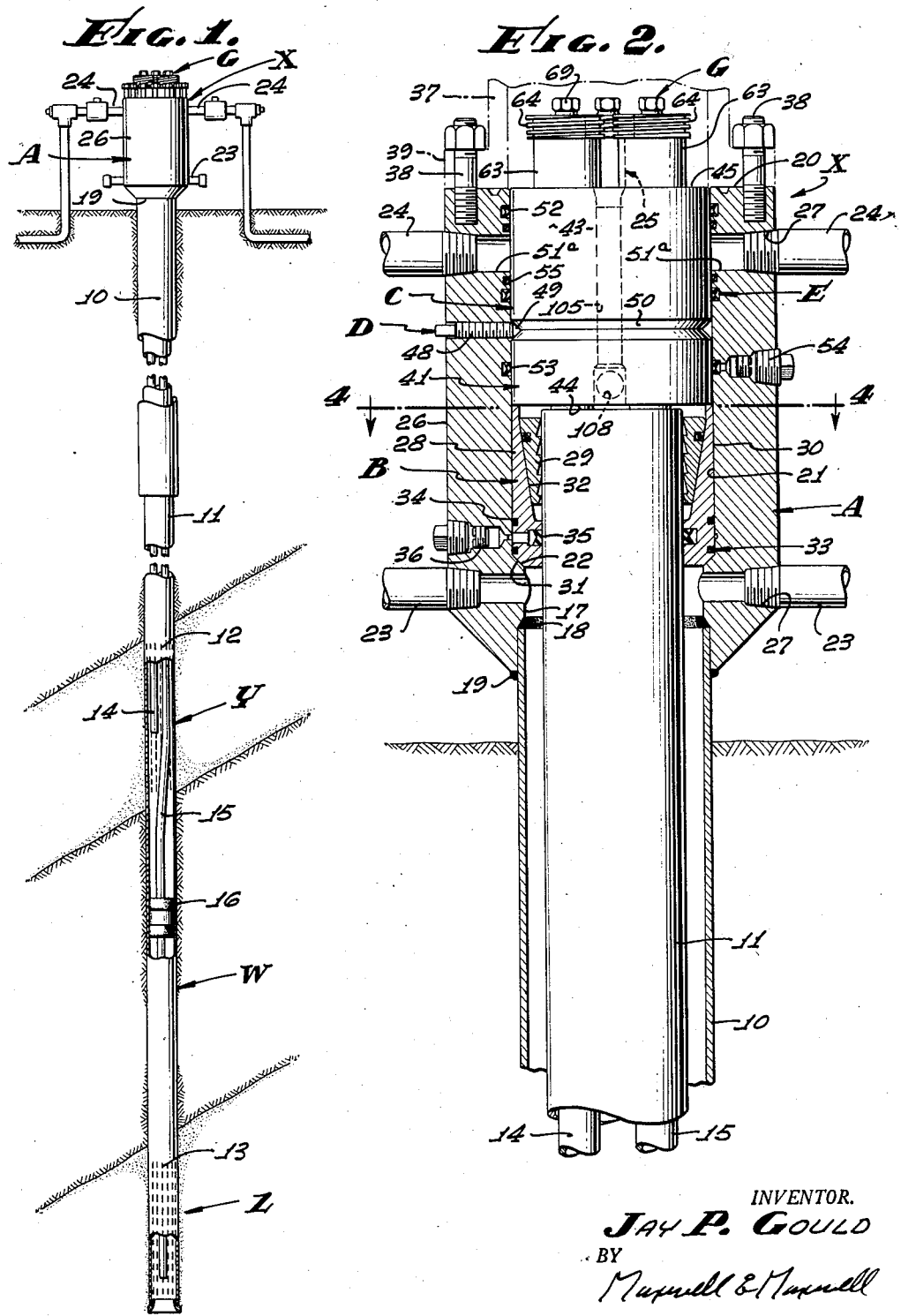
INVENTOR.
JAY P. GOULD
BY
Maxwell & Maxwell
AGENTS.

June 9, 1959  J. P. GOULD  2,889,886
WELL HEAD
Filed Jan. 23, 1956
7 Sheets-Sheet 2
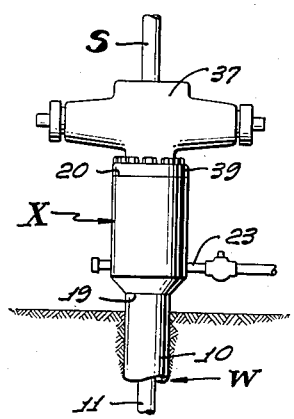
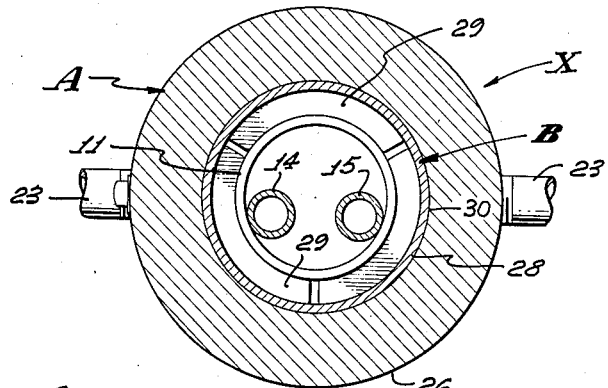
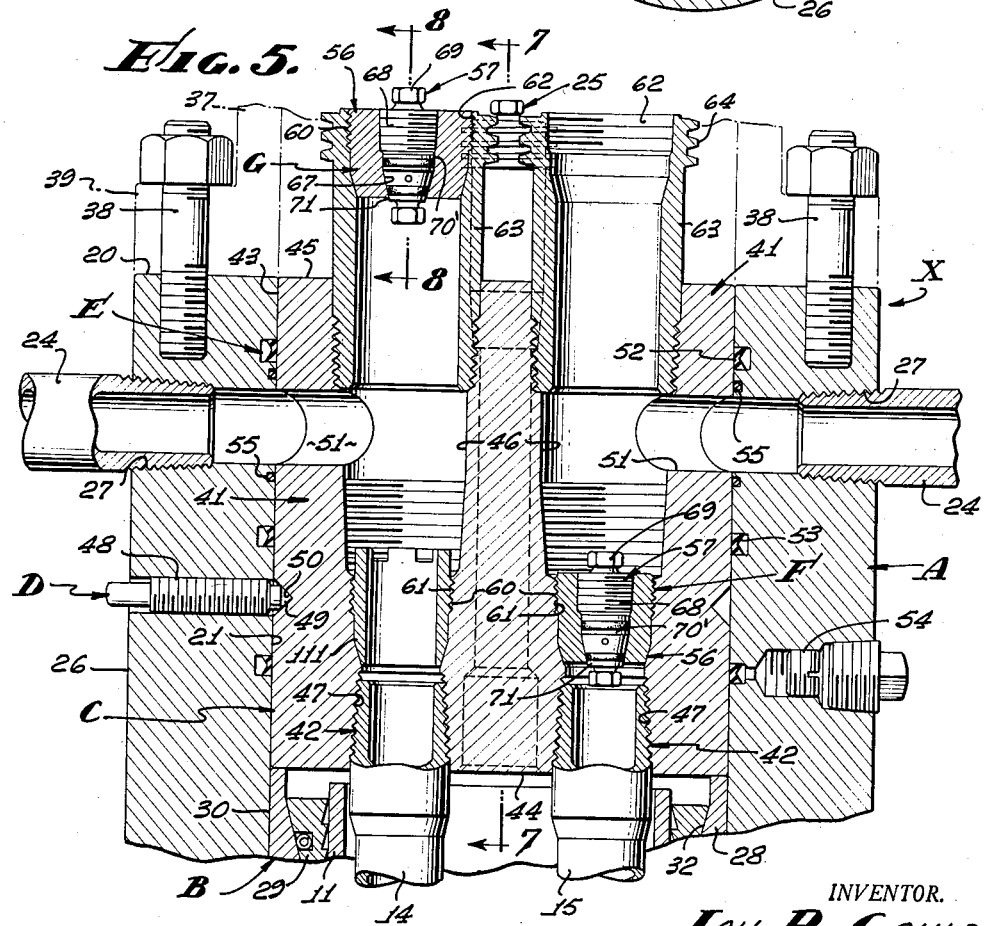
INVENTOR.
JAY P. GOULD
BY
Maxwell & Maxwell
AGENTS.

June 9, 1959  J. P. GOULD  2,889,886
WELL HEAD
Filed Jan. 23, 1956  7 Sheets-Sheet 3
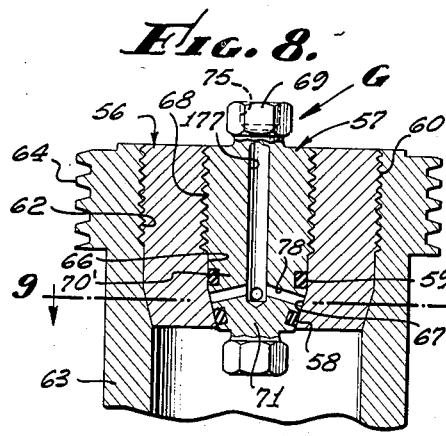
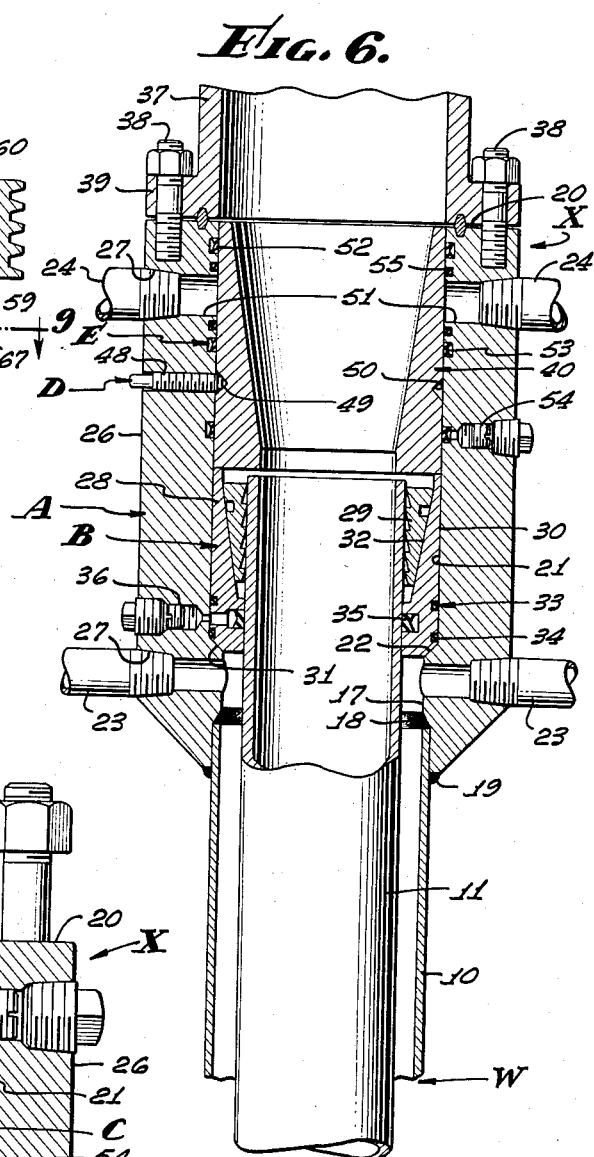
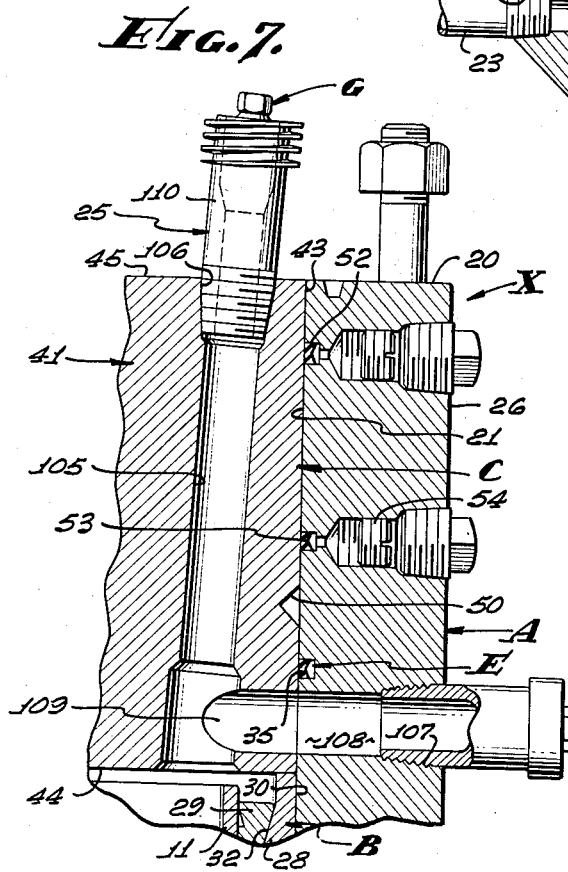
INVENTOR.
JAY P. GOULD
BY
Maxwell & Maxwell
AGENTS.

June 9, 1959    J. P. GOULD    2,889,886
WELL HEAD
Filed Jan. 23, 1956    7 Sheets-Sheet 4
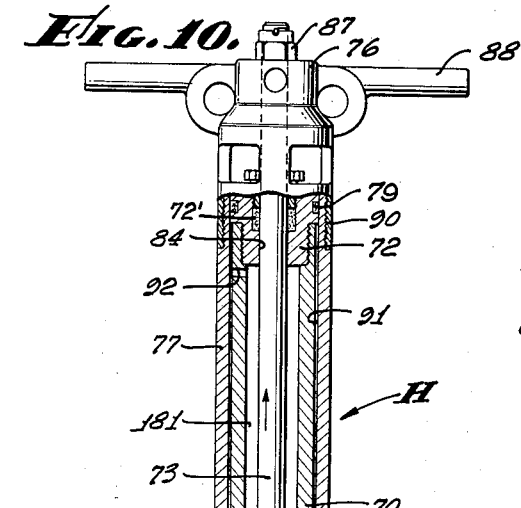
Fig. 10.
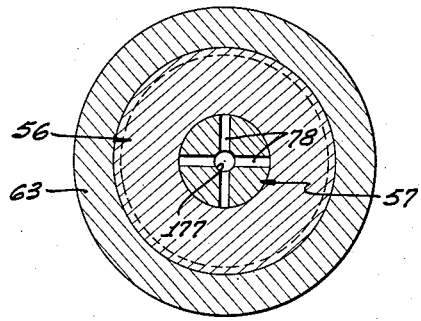
Fig. 9.
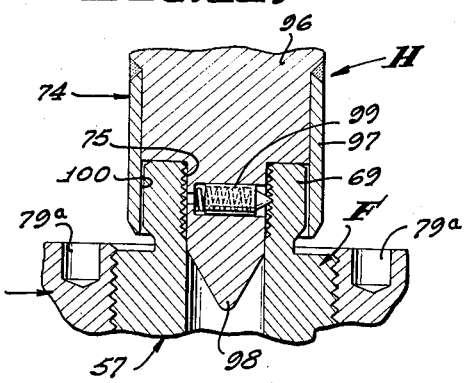
Fig. 11.
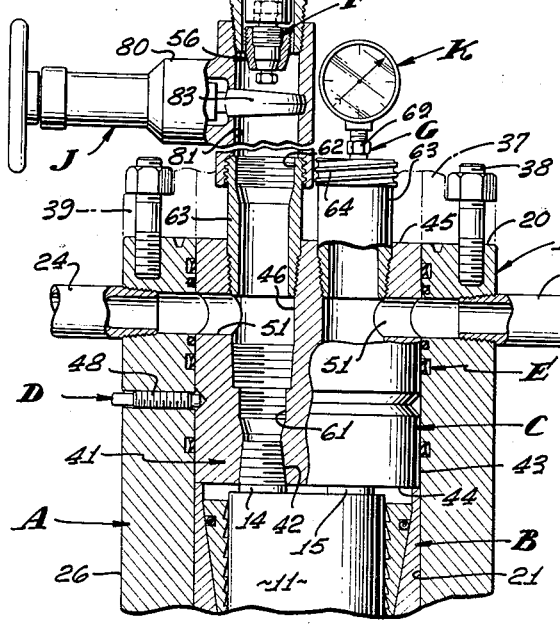
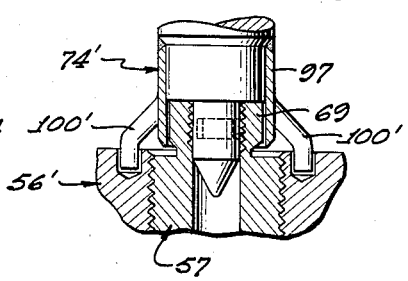
Fig. 11a.
INVENTOR.
JAY P. GOULD
BY
Maxwell & Maxwell
AGENTS.

June 9, 1959  J. P. GOULD  2,889,886
WELL HEAD
Filed Jan. 23, 1956  7 Sheets-Sheet 5
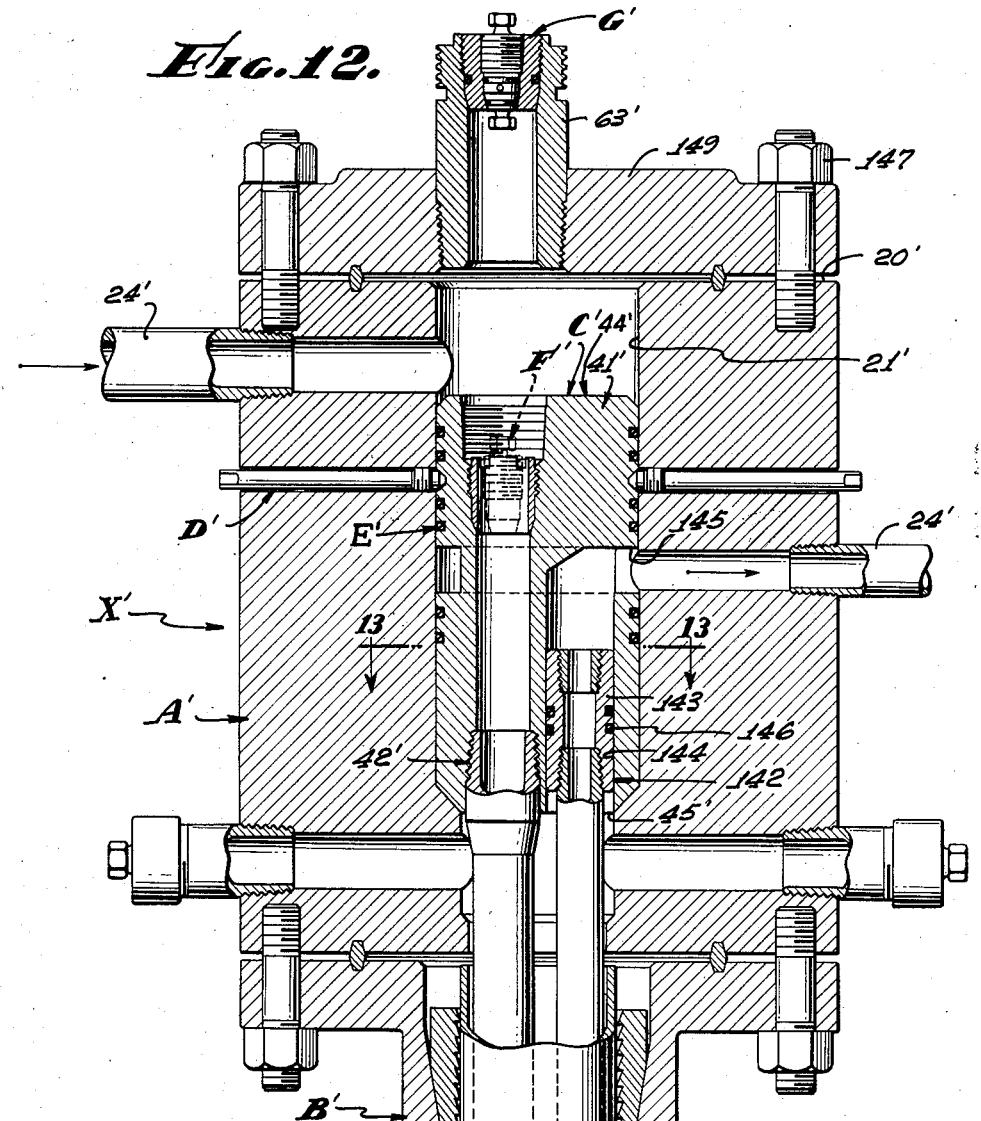
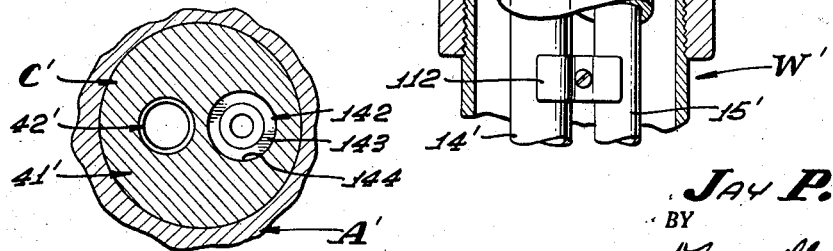
INVENTOR.
JAY P. GOULD
BY
Maxwell & Maxwell
AGENTS.

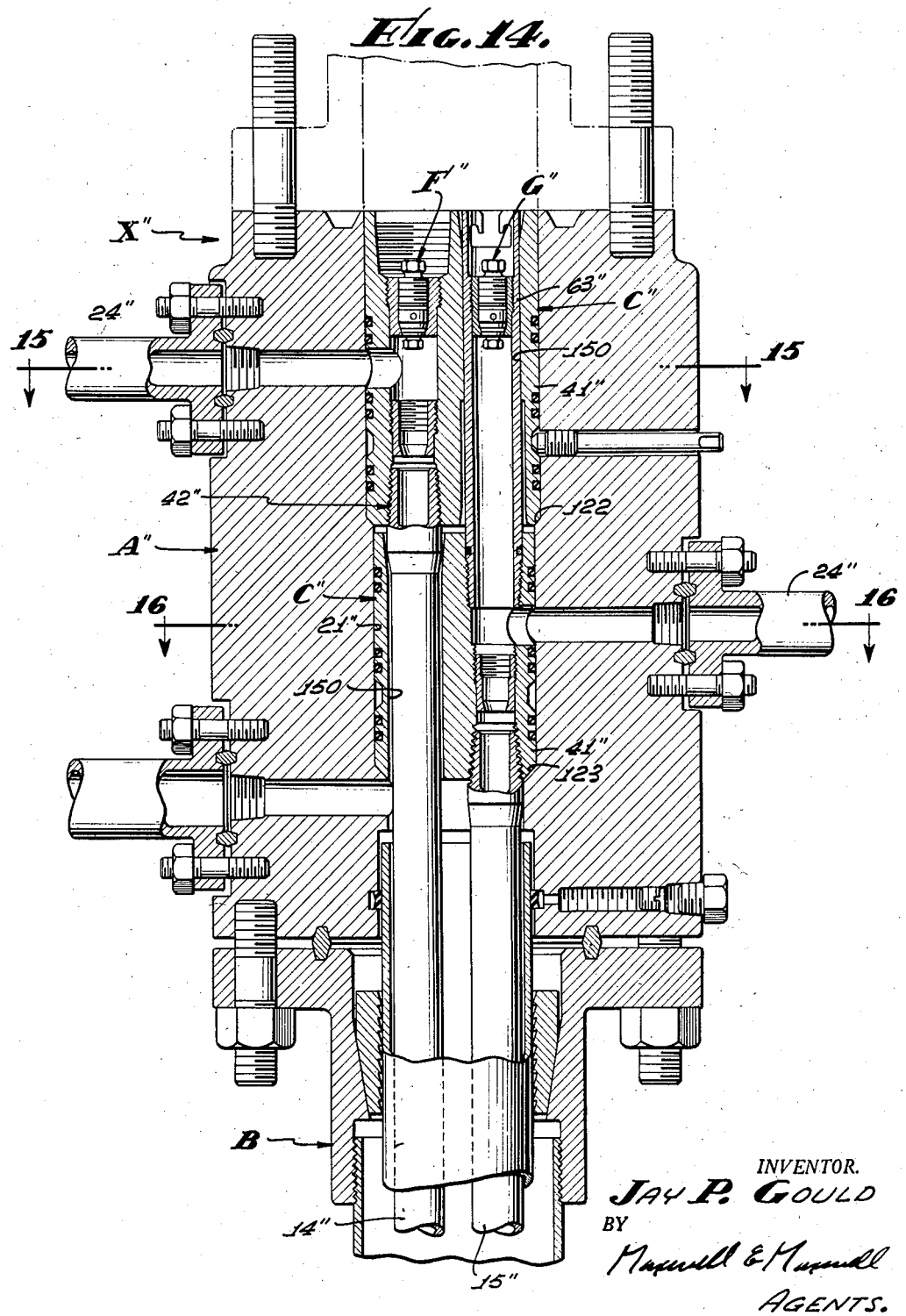

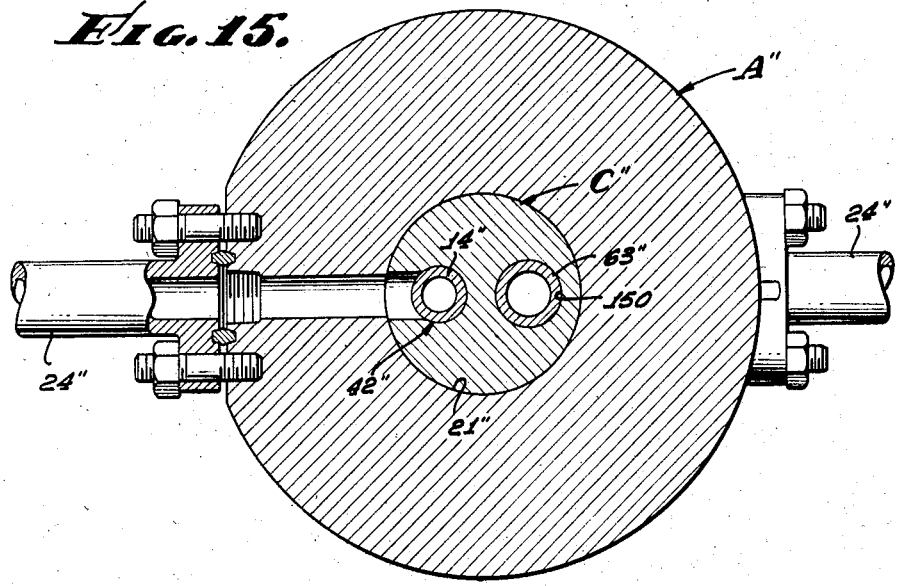
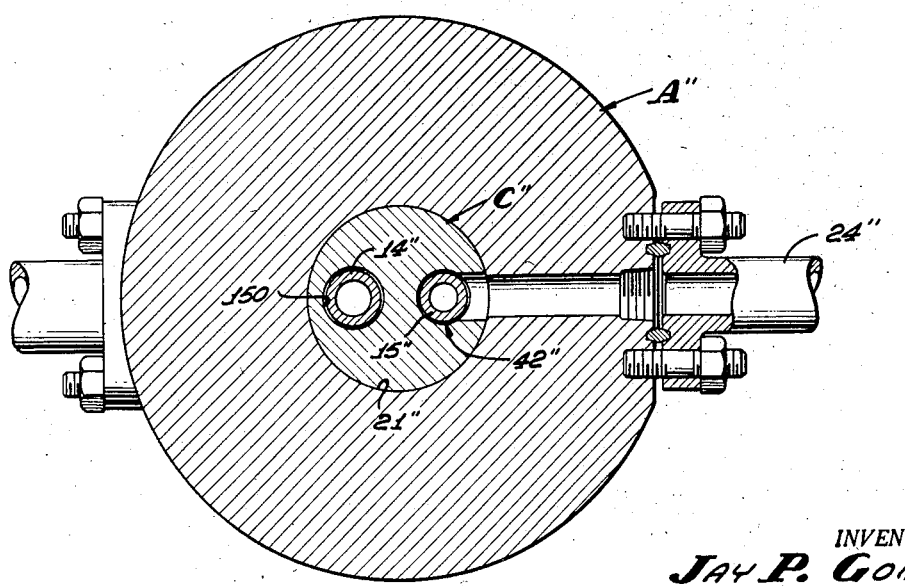

United States Patent Office 2,889,886
Patented June 9, 1959

2,889,886
WELL HEAD
Jay P. Gould, La Canada, Calif.
Application January 23, 1956, Serial No. 560,767
18 Claims. (Cl. 166—89)

This invention relates to a well head and is particularly concerned with the construction applied to the upper end of a well which is supported by the surface casing of the well and which carries the other well elements and associates them so that fluids are produced from the well, it being a general object of the invention to provide a simple, inexpensive, and reliable well head construction that is safe to operate.

In the drilling and construction of an ordinary well, particularly an oil well, the well bore is started and the surface casing set or cemented in place whereupon a casing head is installed. The well bore is then extended and when the likelihood of a blowout arises, a blowout preventer is secured to the casing head. The drilling operation continues and the well bore may pass through one or more producing zones, either gas or oil. When the drilling operation is finished, the well is ready for completion, whereupon the drill pipe is finally removed and one or more casing strings are lowered into operating position. It is to be understood that various other processes are carried out, such as perforating and/or installing a liner, etc. Finally, the ordinary well head equipment is installed in order to handle the fluids produced by the well.

The well head, when assembled, is ordinarily referred to as a Christmas tree and is a rather complicated arrangement of elements secured to the top of the casing head and including additional casing heads and tubing heads and there being several heads joined by flange connections, several flow connections and valves, bonnets, companion flanges, bull plugs, etc. Such Christmas trees are characterized by an assembly of separate units that are individually machined and secured together by special studs and nuts and sealed by means of a number of ring gaskets. These arrangements of flow handling fittings are not only expensive and cumbersome, but are also subject to mechanical defects due to the many parts and connections involved. Further, and a very important factor, the blowout preventer employed during the drilling of the well must be removed from the well each time a new piece of well head equipment is installed and blowout equipment again reinstalled during which operations, the entire well is open to the atmosphere. The latter situation is dangerous, especially in the case of deep and high pressure wells since it ordinarily requires as much as six to eight hours to install the ordinary well head equipment.

A primary object of this invention is to provide a well head construction, the body of which is initially installed in place of the usual casing head and which remains on the well permanently. With the construction that I have provided, the body of the structure is secured or welded to the surface casing and permits the passing of all of the drilling tools therethrough and it receives supplementary parts that carry the necessary tubular elements of the well and also receives the control elements for handling the production fluids and the like.

An object of this invention is to provide a well head of the character above referred to, in which the blowout equipment or preventer is carried in operating position throughout the drilling and completion operations of constructing the well. With the structure of this invention, the production strings are installed and in operation after which time the blowout preventer may be removed.

It is another object of this invention to provide a well head of the character referred to that handles or supports a plurality of production strings in a manner whereby one string is received and supported independently of the other string or strings. With the structure of the present invention, dual production may be obtained from a single well bore in a manner that the tubing producing from one zone may be serviced or taken out of operation without killing or affecting production or flow from the tubing producing from the other zone.

Still another object of this invention is to provide a well head of the character above referred to wherein full unobstructed access is provided to enter the casings during the drilling operation and to enter the tubing strings at any time desired and to enter the annulus around the tubing or tubings as the case may be.

It is also an object of this invention to provide fluid controlling nipples for a well head which are adapted to close the access to the casing, tubing, and annulus above referred to, and which are so located as to provide a shut-off at the top end portion of the casing or tubing, as the case may be, at a point below the wing connections or producing lines connected with the well head. Fluid controlling nipples are also located above said wing connections.

It is still another object of this invention to provide a well head of the character referred to including flow controlling nipples as above described and a nipple applicator or adapter that is used with the well head to either apply or remove the nipples as circumstances require.

It is still another object of this invention to provide a well head having the features above referred to, and in addition thereto, all of the features of the usual Christmas tree. That is, the structure that I have provided, includes, slips for supporting the casing, a tubing hanger for supporting one or more strings of tubing, adequate sealing and packing means, and various other features that will be apparent from an examination of the drawings of this application.

It is also an object of this invention to provide a well head of the character referred to which is adapted to be used in connection with artificial production methods such as gas lift methods of producing fluids from a well wherein parallel strings of tubing are employed, one string being used to introduce gas under pressure in order to lift fluid through the other strings.

An object of this invention is to provide a well head of reduced size and which is extremely compact and capable of withstanding extremely high operating pressures with a maximum of safety.

The various objects and features of my invention will be fully understood from the following detailed description of typical preferred forms and applications of my invention, throughout which description reference is made to the accompanying drawings, in which:

Fig. 1 is a diagrammatic view showing in elevation, a typical well embodying the features of the present invention and showing parts of the well in section. Fig. 2 is an enlarged sectional view of the well head shown in Fig. 1 of the drawings, Fig. 3 is a view of a portion of the well shown in Fig. 1 and showing the blowout equipment applied to the well head that I have provided. Fig. 4 is a transverse sectional view taken as indicated by line 4—4 on Fig. 2. Fig. 5 is an enlarged detailed sectional view of a portion of the structure shown in Fig. 2 of the drawings. Fig. 6 is a view similar to Fig. 2 illustrating the condition of the well before the tubing strings are applied thereto. Fig. 7 is a detailed sectional view of a portion of the structure taken as indicated by line 7—7 on Fig. 5. Fig. 8 is an enlarged detailed sectional view taken as indicated by line 8—8 on Fig. 5. Fig. 9 is a transverse sectional view taken as indicated by line 9—9 on Fig. 8. Fig. 10 is an enlarged sectional view showing the applicator or adapter that I have provided and the manner in which it is used to withdraw or apply a flow controlling nipple to the well head of the present invention. Fig. 11 is an enlarged detailed sectional view illustrating the engagement of the coupling means that I have provided in order to handle the flow controlling nipples. Fig. 11a is a view similar to Fig. 11 and shows a modified form of coupling means provided to handle the flow controlling nipples. Fig. 12 is a view similar to Fig. 2 of the drawings and illustrates a modified form of the well head that I have provided wherein provision is made for a gas lift pumping apparatus. Fig. 13 is a sectional view of a portion of the structure taken as indicated by line 13—13 on Fig. 12. Fig. 14 is a view similar to Figs. 2 and 12 and showing another modified form of the present invention wherein separate tubing hangers are employed to support separate tubing strings. Fig. 15 is a transverse sectional view taken as indicated by line 15—15 on Fig. 14, and Fig. 16 is a transverse sectional view taken as indicated by line 16—16 on Fig. 14.

The well head structure of the present invention is particularly useful on high pressure self-flowing wells, although it will be understood that the structure can be used to advantage on wells of lower pressure and even on wells where pumping apparatus is required. The embodiment of the invention illustrated in Figs. 1 to 9 of the drawings is a typical embodiment and shows a well head X applied to a well W having two production zones Y and Z. The well W involves a surface casing 10 that may be cemented in place, a casing 11 that may be perforated at 12 and 13 in the two production zones Y and Z, respectively, and a pair of tubing strings 14 and 15. The string of tubing 14 depends from the well head X and terminates at the zone Y while the string of tubing 15 depends from the well head X parallel to the string 14 and terminates at the zone Z. A suitable packer 16 is carried on the tubing string 15 and seals with the casing 11 below the zone Y in order to isolate the two producing zones Y and Z.

The well head of the invention is adapted to be installed on a well of the character above referred to and involves, generally a tubular housing structure comprising a casing head or body A, means for supporting a main casing comprising a hanger B, and hanger structure comprising a tubing hanger C. The body A is applied to the upper end portion of the surface casing 10 and carries the hangers B and C, and the well head X also includes lock-down means D for the casing and tubing hangers, and sealing means E between the body A and the tubing hanger C. In addition to the above mentioned elements, the well head X also involves a flow controlling closure or nipple F in the tubing hanger C and adapted to close the top ends of the tubing strings 14 and/or 15, flow controlling closures or nipples G in the top of the tubing hanger C and closing the upper end thereof, and an applicator or adapter H provided to handle the nipples F and G to gain access to the tubing strings 14 and 15 in order to service them individually when the need arises.

The well head structure that I have provided is primarily a piece of pressure controlling equipment that can be used on extremely high pressure wells, and the casing head or body A thereof is preferably applied or secured to the upper end portion of the surface casing 10 in a permanent positive manner. As shown, the body A involves a cylindrical vertically disposed body having a central bore 17 engaged over the upper end portion of the casing 10. The surface casing 10 enters the bore 17 and is permanently joined to the body A by means of continuous inner and outer welds 18 and 19. The casing 10 terminates within the lower portion of the body A while the bore 17 extends through the body to open at the top end 20 thereof. The top end 20 is a flat end in a plane normal to the axis of the body, and a counter bore 21 of enlarged diameter enters the body A from the end 20 and extends downwardly into the body to terminate at a shoulder 22 located above the upper end of the casing 10. The bores 17 and 21 are concentric bores and shoulder 22 is an annular shoulder that faces upwardly and is adapted to support the casing hanger B and tubing hanger C.

In accordance with the invention, the body A is intended for use on a complete well in place of the usual christmas tree, and is, therefore, provided with laterally opening wing connections, there being one or more surface casing connections 23 and one or more tubing or discharge connections 24. A casing connection 25 that opens substantially vertically into the casing 11 around the tubing strings 14 and 15 is also provided in the hanger C as hereinafter described. As illustrated, the connections 23 and 24 are simple pipes connected to horizontally disposed openings 51a extending laterally through the body A between the counter bores 17 and 21 and the cylindrical outer wall 26 of the body. Threads may be provided at 27 to receive flow handling pipes or production lines as circumstances require.

The casing hanger B, as best illustrated in Figs. 2, 4, and 6 of the drawings, is provided to suspend the casing 11 within the casing 10 and within the well bore so that it is held under tension. As shown, the casing hanger B involves a supporting sleeve 28 carried by the body A and hanger slips 29 operating in the sleeve 28 and adapted to engage and support the casing 11. The hanger B may be a typical hanger engageable over the upper end portion of the casing 11. That is, the hanger B may be adapted to open and to close around the casing 11 to have gripping engagement therewith. However, I have shown a simple hanger B, the sleeve 28 of which is a continuous annular element having an outer cylindrical wall 30 slidable in the counter bore 21 and terminating in a downwardly facing end 31 and having supporting engagement with the shoulder 22. It will be apparent that when the hanger B is lowered into the body A, it is supported by the shoulder 22. The sleeve 28 is characterized by a tapered inner wall 32 that cooperates with the hanger slips 29.

The slips 29 are arcuately formed wedge-shaped parts provided with inwardly projecting upwardly facing wickers adapted to bite into and grip the exterior of the casing 11. The inner wall 32 of the sleeve 28 is tapered downwardly and inwardly so that weight or tension applied when the casing 11 is finally permitted to be supported by the hanger B acts to shift the wedges or slips 29 inwardly into tight supporting engagement with the casing. As shown, the upper end of the sleeve 28 is flat and in a plane normal to the axis of the body A and supports the tubing hanger C, later described.

In the preferred form of the invention, sealing means 33 is provided to close off the annulus between the casings 10 and 11, and as shown, involves one or more outer rings 34 acting between the bore 21 and sleeve 28 and an inner ring 35 acting between the sleeve 28 and the exterior of the casing 11. The rings 34 and 35 may be of suitable design and configuration and may be pressure operated from an exterior force as by a manually operable fluid pressure generating means shown at 36.

With the structure thus far described and as clearly shown in Fig. 6 of the drawings, the well W may be drilled to its full depth by operating a drilling string S (see Fig. 3) through the body A and casing 10 or 11. As shown in Figs. 3 and 6, blowout equipment is provided in the form of an ordinary blowout preventer 37 carried at the upper end of the body A and secured to the top end 20 of the body by means of studs 38 projecting from the end 20 and engaged through a flange 39 on the blowout preventer 37. It is a feature of this invention that the blowout preventer 37 remains in operating position until after the entire well is completed and in production. Further, during the drilling and various other operations required to complete a well, protecting sleeves may be inserted in the bore 21 in order to protect the machined surfaces of the structure. As illustrated in Fig. 6, after the casing 11 is in position, a protecting sleeve 40 is inserted into the bore 21 to rest on the upper end of the sleeve 28 and is suitably tapered in order to guide tools and equipment into and out of the casing.

The tubing hanger C, as best illustrated in Figs. 2 and 5 of the drawings, is provided to suspend one or more tubing strings such as the strings 14 and 15, as circumstances requires, so that the string of tubing is supported by the well head. It is a feature of this invention to support a plurality of tubing strings by means of the single hanger unit C that I have provided and which involves a head 41 carried in the body A and closing the bore 21, the head 41 being provided with one or more tubing receiving means such as threads 42. The head 41 of the hanger C is a cylindrical part having an outer peripheral wall 43 slidably carried in the bore 21, a flat bottom 44 having seating engagement with the upper end of the sleeve 28, and a flat top 45.

The head 41 is inserted into the bore 21 after the drilling operation is completed and in place of the protecting sleeve 40. It will be understood, however, that the production string or strings of tubing are in place and are coupled to the receiving means or threads 42. One or more tubing receiving means or threads 42 may be provided in the head 41 as circumstances require, and, as shown in the preferred form of the invention, there are two like tubing receiving means 42, each being located in a bore 46 extending vertically through the head 41 to open at the top 45 and bottom 44. Thus, the string of tubing to be suspended is simply threaded into the lower end portion of the bore 46 thereby joining the string of tubing to the tubing hanger C. When two or more tubing receiving means 42 are provided, they are parallel to each other and are located at points offset laterally from the vertical axis of the body A, casing hanger B, and tubing hanger C, as shown.

The lock-down means D are provided to hold the tubing hanger C and casing hanger B in tight seating engagement with each other and with the shoulder 22 to be supported thereby. Any suitable means may be employed, and, as shown, I provide a lock screw 48 threaded into lateral openings in the body A and having a conical point 49 engageable with the lower face of a V-shaped notch 50 in the outer wall 43 of the head 41. Engagement of the screw 48 in the notch 50 also rotatively orients the parts.

With the parts rotatively and vertically oriented by means of the lock-down means D, the communication of fluids from the tubing strings to the wing connections 24 is a simple matter. As best shown in Fig. 5 of the drawings, a lateral port 51 extends from each bore 46 to the exterior wall 43 of the head 41 in register with one of the openings in the wall of the body A. Thus, fluid may be withdrawn from or introduced into the bores 46 to communicate with either one of the tubing strings 14 or 15.

The sealing means E between the body A and tubing hanger C may be any suitable sealing means adapted to isolate the flow of fluids from the separate tubing strings 14 and 15 and may include one or more upper rings 52 and one or more lower rings 53. The rings 52 and 53 may be of suitable design and configuration and may be pressure operated from an exterior force as by a manually operable fluid pressure generating means shown at 54. The rings are located above and below the ports 51 while rings 55 may be provided that surround each individual port in order to confine the flow of fluids.

With the structure thus far described, it will be apparent how the well bore is drilled, lined with casing, etc., and how the production strings are lowered into place and suspended in working position. All of the above operations are carried out with safety and assurance since the blowout equipment is in working position and need not be removed. However, at this point in the construction of an ordinary well, it is necessary to remove the blowout equipment in order to install the various individual parts of the christmas tree. That is, the blowout preventer must be replaced by the casing heads and tubing heads, etc., and obviously, during this time the entire well is open to atmosphere. This latter condition is a dangerous condition in high pressure wells where blowouts are likely to occur.

In accordance with the present invention, the structure provided makes possible the completion of a well without removing the blowout equipment with the result that the danger of blowouts is eliminated. That is, the blowout preventer may be maintained in operating position during completion of the well. As shown in the drawings, I have provided the flow controlling closures or nipples F and G. The nipple F is adapted to be installed at the upper end of the production tubing below the wing connections 24 while the nipple G is adapted to be installed at the upper end of the head 41 above the wing connections 24. The nipples F and G are provided to close the bores 46 at the points above indicated and are threaded parts or units that may be individually installed or removed from the head 41 and may be controlled by means of the applicator or adapter H.

The nipples F and G are alike and each involves, generally, an elongate tubular base 56, a carrier 57 and spaced sealing means 58 and 59 acting or sealing between the base and carrier.

The base 56 of the nipple is provided at its outer wall with means 60 for making connection with the fluid pressure handling or carrying bore 46 in the head 41. In the case illustrated, there is a threaded seat 61 in the bore 46 adjacent to and located above the tubing receiving means 42, and a threaded seat 62 for the bore 46 at or adjacent the top 45 of the head 41. In practice, the seats 62 may be provided in tubular extensions 63 that project up from the top end 45 of the head 41. The seats 61 and 62 are provided to receive the bases of the nipples F and G, respectively. The means 60 preferably involves an external thread on the outer wall of the base 56, so that the base has threaded engagement with the seats, as shown throughout the drawings.

The extension 63 is provided at its outer end portion with means for making connections with a flow control J and for making connection with the nipple. In the case illustrated, these are separate means, the means for carrying the control J being an external thread 64 on the outer end portion of the extension and the means for carrying the nipple G being an internal thread formed by the seat 62 in the outer end portion of the opening that occurs through the extension 63. The inner diameter of the tubular extension 63 is of a size to freely pass the nipple F.

There is an opening provided through the base 56 which has an outer end portion 66, and a shoulder or seat 67 adjacent the inner end portion of the base. The portion 66 is threaded for a portion of its length, and the particular shoulder or seat 67 illustrated in the drawings is inclined or tapered, as clearly appears in Fig. 8 of the drawings.

The carrier 57 of the nipple is an elongate part or element with a central portion 68 externally threaded and engaged with the threaded part of the portion 66 in the base, an outer end portion or head 69 outward of the portion 68 and projecting beyond the outer end of the base, and an inner end portion or plug 70' slidable in the portion 66 of the base opening and having a tapered end 71 movable into and out of engagement with the seat 67 of the base.

The seals or sealing means 58 and 59 are axially spaced, and they are preferably annular seals or packing devices carried by the carrier 57, one on the tapered portion 71 thereof and the other on the plug portion 70' thereof. The seal 59 serves to maintain sealing engagement between the plug portion 70' and the wall of opening 66 at all times when the carrier is in operating position in the base, whereas the sealing means 58 on the tapered portion of the carrier is movable into and out of sealing engagement with the seat 67.

The carrier 57 is provided with means for holding or carrying a gauge K (see Fig. 10) or the like, and in the case illustrated, where the carrier has a projecting head portion 69, it is preferred to provide the head portion with an internal thread 75 to receive the projecting threaded nipple 76 of the gauge. A central longitudinal flow passage 177 is provided in the carrier and extends from the head end to a point near the inner end portion of the carrier. Lateral ports 78 extend between the passage 177 and the exterior wall of the tapered end 71 so that when the carrier is operated to a retracted or open position, the sealing means 58 is removed from the seat 67 and fluid pressure is communicated through the base, through the ports 78 and passage 177 to act on the gauge K or to simply release fluid pressure from the string of tubing.

The gauge or instrument K which may vary as circumstances require is shown as involving a case with a face or dial bearing graduations and a hand or indicator that cooperates with the graduations. The particular gauge illustrated, being of typical construction, has a threaded nipple or mounting element projecting from a polygonal collar, and it is through the nipple that the gauge is mounted on the outer end of the carrier 57 so the gauge receives pressure from the carrier.

The head portion of the carrier 57 is preferably shaped or fitted to receive a suitable tool so that the carrier can be conveniently rotated in the course of its being opened or closed or applied to or removed from the base. In the particular case illustrated, the exterior of the head 69 is polygonal in cross sectional configuration so it has tool receiving faces. In carrying out the present invention, the base 56 may vary as to size and proportion, particularly as to diameter, and as shown in the drawings, the base 56 of the nipple F is of limited size while the base 56 of the nipple G is of enlarged size so that the nipple F can be passed through the seat 62 that extends through the extension 63 when the nipple G has been removed. In accordance with the invention, the base 56 of each nipple unit is provided with tool engaging notches or recesses 79a adapted to be engaged by a spanner or the like on the tool hereinafter described.

The flow control means J employed in carrying out the present invention may vary widely in form and construction, however, it is preferred that it be in the nature of a plug valve or the like. The particular control shown in the drawings is a gate valve having a body 80 with an opening 81 therethrough. The valve body 80 carries a shiftable gate 83. In accordance with conventional gate valve construction, the gate 83 is operable or shiftable to close the valve or to open the valve so that an unobstructed passage occurs therethrough.

The flow control J is applied to or mounted on the adapter as through the threads 64 above described. Where the mounting means for the control J involves an external thread on the outer end of the head extension 63, the valve may be mounted on the extension as shown in Fig. 10 of the drawings. With the control J in this open position, the nipples F or G can be applied to or removed from the head 41 and the carriers of the nipples can be rotated and operated as circumstances require.

The applicator or adapter H provided by the present invention is provided to operate or remove or replace the carriers of the nipples F and G and to remove the entire nipple units F and G through the flow control J without allowing escape of fluid from the well head X.

In accordance with the broader principles of the present invention, the adapter H may vary considerably in form and construction. However, in its preferred form it involves, generally, an elongate housing 70 with coupling means at one end for making connection with the flow control J and with a closure 72 at the other end. A rod 73 is slidably carried by or in the closure 72 of the housing and has an inner end operating within the housing and an outer end projecting outward from or beyond the closure end of the housing. Coupling means 74 is carried by the inner end of the rod 73 and is engageable with the parts of the nipples F or G, and a head 76 is provided on the outer end of the rod. Pressure equalizing means is provided and may include a sleeve 77 carried by the head 76 and extending over the housing 70 while packing means 78' and 79 seal between the sleeve and the housing 70, and the sleeve and an enlargement on the closure of the housing.

The housing 70 is shown as a simple elongate tubular element establishing an elongate chamber 181 of such size and length as to properly accommodate the coupling means 74 and a part coupled thereto such as the carrier 57 of the nipple unit F or G. The coupling means 71 at the inner end of the housing may be a simple external thread or threaded portion engageable in the opening 82 of the control means J and thus providing a releasable connection between the adapter H and the control means J.

The closure 72 provided at the outer end of the housing is shown as a part joined to the housing through a suitable threaded connection, and it has a central bore or opening 84 slidably passing the rod 73. A suitable sealing or packing means seals between the closure and the rod as clearly shown at 72' in Fig. 10 of the drawings.

The rod 73 is a simple, plain, round rod of suitable length slidably supported in and sealed with the closure of the housing. The head 76 is a cup-like element fixed or secured on the outer end of the rod 73 as by suitable fastening means 87, and it may have handle portions 88 to facilitate operation or manipulation of the rod as circumstances require.

The sleeve 77 is a tubular or cylindrical element joined to the head 76 as by a threaded connection 90, and it slidably engages over the enlargement 80 provided on the closure 72. The sealing means 78 provided at the end of the sleeve 77 remote from the head, establishes sealing engagement between the sleeve and housing while the sealing means 78' maintains sealing engagement between the enlargement 80 and the sleeve. It is to be observed that the interior of the sleeve 77 is somewhat larger in diameter than the exterior of the housing so that a chamber 91 occurs between these elements. The chamber 91 is maintained in communication with the interior of the housing 70 through suitable ports 92. It will be observed from Fig. 10 of the drawings that fluid pressure occurring within the housing 70 or in chamber 91, would ordinarily tend to eject the rod 73 or move it outwardly from the housing through the closure, whereas such pressure communicated through the ports 92 and acting in chamber 91 acts on or through the sleeve 77 tending to move the sleeve, head and rod inwardly or in the opposite direction. By properly proportioning the structure or the elements just described, the forces acting in opposite directions can be balanced so that no matter what pressure is communicated to the tool from the well and through the adapter and flow control, the tool can be conveniently operated. For example, the head can be easily moved in and out to reciprocate the rod or it can be rotated to cause turning of the rod.

The coupling means 74 serves, generally, as a releasable connection or coupling between the rod 73 and the carrier 57 of the adapter. In the preferred form of the invention, the coupling means 74 is adjustable on or longitudinally of the rod 73 so that its working end which engages the carrier can be varied as to position as circumstances may require. In the particular case illustrated, the adjustable mounting of the means 74 on the rod 73 involves a sleeve 93 engageable over or slidable on the rod and a set screw 94 is threaded in a lateral opening in the rod 73 and has a head selectively engageable in openings 95 provided in the sleeve 93 to register with the opening in the rod.

The coupling means 74 has a body portion 96 projecting forward from the sleeve 93 so it is beyond the end of the rod, and the body portion 96 carries a drive element 97 engageable with the head 69 of the carrier, a pilot member 98 engageable in the carrier, and a releasable retainer 99 engageable with the carrier.

The pilot element 98 is preferably a suitably shaped or pointed guide or centering pin on the end of the body 96, and it is shaped and proportioned to slidably enter the threaded outer end portion of the gauge carrier 57 in a manner such as is shown in Fig. 11 of the drawings. The retaining means 99 is preferably carried by the pilot member, and as shown in the drawings, it may involve a spring biased detent engageable with the threads in the outer end portion of the gauge carrier. The drive member 97 is preferably a thin-walled, sleeve-like element extending beyond the end of the body 96 and around the guide pin 98 and having a socket opening 100 corresponding in size and shape to the polygonal exterior of the head 69.

With the mounting or coupling means 74 formed and constructed as just described, it will be apparent that it can be engaged with the projecting outer end portion of the carrier in the manner shown in Fig. 11, so that rotation of the rod 73 in the right direction will result in unthreading of the carrier from the base 56, and when this has been accomplished, the center pin 98 co-acting with the retaining means 99, maintains the detached carrier coupled with the rod 73 so that withdrawal or outward movement of the rod 73, as indicated by the arrow in Fig. 10, results in withdrawal of the gauge carrier through the control means J.

Another form of mounting or coupling means 74' is shown in Fig. 11ª of the drawings. As shown, the drive element 97 is freely engageable over the head 69 and has depending spanner elements 100' engageable in the openings 79 above referred to. With the means 74', the base 56' of the nipple may be rotated and the entire nipple unit removed from the seat 61 or 62.

The casing connection 25, hereinabove referred to, is provided in the head 41 of the tubing hanger C and is provided in order to gain access to the interior of the casing 11 surrounding the production strings 14 and 15. The connection 25 is characterized by a substantially vertically dispsoed opening that extends through the head 41 preferably at a slight angle thereto, and, as shown, involves a bore 105 extending vertically through the head 41 to open at the top 45 and bottom 44 thereof, a lateral opening 108 in the side of the body A and a port 109 in the head 41 between the bore 105 and the opening 108. The bore 105 is a straight cylindrical bore offset from the bores 46, and the seat 106 is a threaded seat in the bore and is adapted to receive a flow controlling closure or nipple G. As shown, the nipple is carried in an extension 110 provided with a suitable seat adapted to receive the base of the nipple. The port 109 is a lateral port that extends between the bore 105 and opening 108, which opening opens from the side of the body A while the seat 106 is located at the top of the head 41. The lateral opening 108 is provided with coupling threads at 107 to receive a closure such as one of the nipples that I have provided or a bull plug, or the like, as circumstances require. The connection formed by the opening 108 may be used during the drilling operation in handling the circulating fluid or mud which is used during said operation. When it is desired to gain access to the interior of the casing 11 in order to run instruments or the like into the well, it is merely necessary to remove the nipple G from the seat 106. If it is desired to gain a pressure reading of the interior of the casing 11, it is merely necessary to apply a gauge K to the carrier of the nipple G and to release pressure to the gauge by rotating the carrier.

It is believed that the methods of operating the well head X that I have provided will be apparent from the foregoing description although the methods of operation may vary widely as circumstances require. In order to complete a well under pressure, the tubing strings may be plugged or capped by the nipples F that are applied to the seats 61. When the head 41 is finally positioned and supported by the shoulder 22 in the body A, and with the tubing string closed in this manner, gauges K may be applied to the nipples F in order to determine the pressures within the tubing strings. In accordance with the invention, and with the tubing strings closed in this manner, the fluid producing lines and valves may be connected to the connections 24 by engaging suitable pipe lines with the threads at 27. After the desired production connections and manifolding have been applied to the well head X, as shown in Fig. 1 of the drawings, the nipples G are applied to the seats 62 at the upper end portion of the head 41 whereupon the nipples F may be withdrawn or extracted from the bore 46 by using the adapter or applicator H in the manner above referred to. Since the nipples F are smaller in diameter than the bore of the seat 62, the coupling means 74 of the adapter H engages the nipple F and may be operated to withdraw the nipple F through the seat 62. A suitable protector sleeve 111 may be applied to the seats 61 in order to prevent wearing of the threads thereof. The nipples G are finally applied to the head 41 in order to close the upper end of the bores 46. With the bores 46 closed by the nipples G, the adapter H and control J may be removed from the well head X leaving the structure in the condition shown in Fig. 1 of the drawings. It will be apparent that either one of the tubing strings may be entered individually at any time during the lifetime of the well without interfering with the production or operation of the other string.

The embodiment illustrated in Figs. 12 and 13 of the drawings is another typical embodiment of the present invention and shows a well head X' applied to a well W' equipped with a gas-lift type pumping apparatus. The second form of the invention under consideration involves, generally, a housing structure including a body A' and a casing hanger B'. Within the body A' is a tubing hanger C'. The body A' may be applied to the upper end of the surface casing in the same way as the body A. However, the body A' is shown applied to and supported by an ordinary casing head or hanger construction B'. This second form of the invention may also include lock-down means D' for the tubing hanger, sealing means E', and flow controlling nipples F' and G', all as above described in connection with the first form of the invention.

The tubing hanger C', illustrated in Fig. 12 of the drawings, is provided to suspend a pair of tubular elements such as are used to pump oil from a well. One of the elements 14', the larger of the two, may be used to carry the pump at the bottom of the well, while the other element 15' may be used to deliver fluid from a ring connection 24'. Fluid under pressure is fed into the larger element which conducts said fluid to the pumping apparatus located at the oil bearing zone of the well W'. As shown, these tubular elements 14' and 15' are fastened together by clamps 112 so that the larger and stronger element will support the more slender one. The hanger unit C' involves a head 41' carried in the body A' the same as head 41, a tubing receiving means 42' the same as the means 42, and a tubing receiving means 142.

The tubing receiving means 142 is provided to slidably receive and seal with the top end portion of the tubular element 15'. As shown, this means involves a head 143 carried by the tubing 15' and a head receiving bore 144 entering the head 41' from the bottom 45' thereof. The bore 144 is a straight vertically disposed cylindrical bore that enters the bottom 45' of the head 41' and terminates at a point intermediate the top and bottom of the head. As shown, a port 145 is provided that extends between the bore 144 and an opening in the side of the body A'. The opening in the side of the body is a part of a wing connection 24' and receives fluid produced by the well W'.

The head 143 is a tubular part threaded onto the upper end of the tubular element 15' and slidably enters the bore 144 to be positioned just below the port 145. Sealing rings 146 are carried by the head to seal against the bore 144. In order to assemble the tubular element 14' and 15' with the head 41' it is merely necessary to couple the element 14' with the head 41' and to then enter the head 143 into the bore 144. The head 143 is carried on the upper end of the uppermost section of element 15' which may then be lowered and rotated to make connection with the remainder of the string at a point below the head 41'. The head X' is then ready to be lowered into the body A' to be supported thereby.

As illustrated in Fig. 12 the head 41' is carried in a counter bore 21' in the body A' and terminates in a flat top end 44' at a point spaced below the top 20' of the body. In this form of the invention, the wing connections 24' are formed in the body at different levels, there being a lower connection that communicates with the port 145 and an upper connection that communicates with the bore 21' above the head 41'. The top 20' of the body and the bore 21' are closed by a bonnet or plate 149 constituting part of the housing structure and secured to the head by fasteners 147 and sealed therewith. The upper flow controlling nipple G' is carried by an extension 63' that projects upwardly from the plate 149 and registers with the nipple F' and parts associated with the tubular element 14'.

The embodiment illustrated in Figs. 14 to 16 of the drawings is still another typical embodiment of the present invention and shows a well head X" applied to a well W" having two separate production tubes 14" and 15". The third form of the invention under consideration involves, generally, a body A", a casing hanger B", and a plurality of tubing hangers C". This form of the invention may include the other features above described in connection with the first form of the invention. It is a feature of this form of the invention that there is a separate tubing hanger for each tubing, and where there are two tubes, there are two tubing hangers C". The bore 21" that enters through the body A" is provided with upper and lower seats or shoulders 122 and 123 provided to support upper and lower hangers which are supported in the body A", one above the other. In accordance with the invention, the lowermost head C" has a tubing receiving means 42" and a tubing opening 150 laterally offset from the means 42". Both the means 42" and the opening 150 extend through the head 41" of the hanger on vertical axes, the opening 150 being of enlarged diameter to freely pass one of the tubes, for example, the tube 14". The tube 15" is shown as being supported by the means 42" of the lowermost hanger C". The uppermost tubing hanger C" may be the same as the lowermost hanger C" and has the tubing receiving means 42" and the offset opening 150. The means 42" of the uppermost hanger C" receives and supports the tube 14" while the opening 150 in the head 41" of the hanger freely passes an extension 63" that is coupled to and projects upwardly from the lowermost hanger C". The nipples F" and G" may be applied to seats located above and below the wing connection 24" in the same manner as above described.

From the foregoing it will be apparent that I have provided an extremely simple well head structure which may be permanently installed on a well and used in various manners. The well head of the invention may accommodate any of the methods and apparatus used in connection with drilling and servicing wells, and it is of inherently rugged construction and safe to operate.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A well head providing a lateral discharge connection from a vertically extending tubing string, comprising a housing structure having its lower end adapted to be rigidly secured to a surface casing, said housing structure having a lateral opening intermediate its ends for said discharge connection, means for supporting a main casing in the lower part of said housing structure, hanger structure mounted in said housing structure above said means and having a passage extending vertically therethrough and communicating with said lateral opening, said hanger structure having threads at the lower end of said passage to receive and support the tubing string and having threads intermediate the ends of the hanger structure below said lateral opening to receive a nipple, one of said structures having a threaded opening at the upper end thereof aligned with said passage and adapted to receive a nipple means to provide access to said passage.

2. A well head according to claim 1, in which said upper threaded opening is larger in diameter than said intermediate threads and is of sufficient size to permit the nipple for the intermediate threads to be freely pased therethrough.

3. A well head according to claim 1, in which said housing structure has a vertically extending bore open at its lower end, with said casing supporting means located in the lower part of said bore, and said tubing hanger located in said bore above said casing supporting means, and said lateral opening extends from said bore to the exterior of said housing structure.

4. A well head according to claim 1, in which said housing structure has an additional lateral opening located above said casing supporting means and communicating with said main casing.

5. A well head comprising a generally tubular housing having its lower end adapted to be rigidly secured to a surface casing and having a lateral opening intermediate its ends, means for supporting a main casing in the lower part of the housing below said opening, and a tubing hanger mounted in the housing above said means and having one or more passages extending vertically therethrough, said tubing hanger in at least one of said passages having threads at the lower end of said one passage to receive a tubing string and having threads at the upper end of said one passage to receive a nipple means, said tubing hanger also having nipple-receiving threads in said one passage intermediate its ends and having a lateral port registering with said lateral opening of the housing and located between said intermediate threads and said upper threads.

6. A well head according to claim 5, in which said housing has a vertically extending bore therethrough with said casing supporting means and said tubing hanger located in said bore, and in which said housing has an internal shoulder supporting said casing supporting means and said tubing hanger is supported on said casing supporting means.

7. A well head according to claim 5, in which said housing has an additional lateral opening below said casing supporting means and communicating with said surface casing.

8. A well head according to claim 5, in which said housing has an additional lateral opening located above said casing supporting means and angularly offset from the first-mentioned lateral opening, and said tubing hanger has an additional passage lateral spaced from said one passage and has nipple-receiving threads at the upper end of said additional passage, said additional passage having a lateral port registering with said additional opening to provide communication with the interior of the main casing.

9. A well head comprising a generally tubular housing having its lower end adapted to be rigidly secured to a surface casing and having a pair of angularly spaced lateral openings intermediate its ends, means for supporting a main casing in the lower part of the housing, and a tubing hanger mounted in the housing above said means and having a pair of laterally spaced passages extending vertically therethrough, said tubing hanger having threads at the lower end of each of said passages to receive a tubing string and having threads at the upper end of each of said passages to receive a nipple means, said tubing hanger also having nipple-receiving threads intermediate the ends of each of said passages and having a lateral port in each of said passages registering with one of said lateral openings of the housing and located between said intermediate threads and said upper threads.

10. A well head according to claim 1, in which said housing structure has a vertically extending bore therethrough with an internal shoulder above said casing supporting means, said hanger structure being seated against said shoulder.

11. A well head comprising a housing structure having its lower end adapted to be secured to a surface casing and having a lateral opening intermediate its ends, means for supporting a main casing in the lower part of said housing structure, and a tubing hanger mounted in said housing structure above said means and below said lateral opening and having a passage extending vertically therethrough, said tubing hanger having threads at the lower end of said passage to receive a tubing string and having nipple-receiving threads at its upper end, said passage at its upper end opening into said housing structure to communicate with said lateral opening, said housing structure having a threaded opening at its upper end aligned with said passage and adapted to receive a nipple means to provide access to said passage.

12. A well head according to claim 11, in which said housing structure has an additional lateral opening located above said casing supporting means and below said tubing hanger and communicating with said main casing.

13. A well head according to claim 11, in which said housing structure has a second lateral opening below said first-mentioned lateral opening, and said tubing hanger has a second vertical passage closed at its upper end and open at its lower end to receive a second tubing string, said second passage having a lateral port registering with said second lateral opening.

14. A well head according to claim 13, in which a tubing head adapted to be secured to a tubing string is slidably received in said second passage.

15. A well head according to claim 5, in which said housing has a second lateral opening below said tubing hanger and above said casing supporting means, and a second tubing hanger is mounted in said housing below said first-mentioned tubing hanger and above said casing supporting means, said second tubing hanger having a passage with threads at the lower end of said passage to receive a second tubing string and having a lateral port registering with said second lateral opening.

16. A well head according to claim 15, in which said housing has a vertical bore therethrough to receive said tubing hangers, said bore having a pair of vertically spaced shoulders to support the respective tubing hangers.

17. A well head according to claim 15, in which said second tubing hanger has a bore aligned with the passage in the first-mentioned hanger for the tubing string connected to the first-mentioned hanger.

18. A well head according to claim 15 in which said first-mentioned hanger has a bore aligned with the passage in the second tubing hanger, and an extension is threaded into the passage in the second tubing hanger and extends through the bore in the first-mentioned hanger, said extension having a nipple threaded in its upper end.

References Cited in the file of this patent

UNITED STATES PATENTS

| | | |
|---|---|---|
| 1,859,793 | Rasmussen | May 24, 1932 |
| 1,944,573 | Raymond et al. | Jan. 23, 1934 |
| 1,944,840 | Humason | Jan. 23, 1934 |
| 2,118,094 | McDonough et al. | May 24, 1938 |
| 2,157,964 | Mueller | May 9, 1939 |
| 2,335,355 | Penick et al. | Nov. 30, 1943 |
| 2,589,373 | Hammock | Mar. 18, 1952 |
| 2,623,467 | Andrew | Dec. 30, 1952 |